United States Patent [19]
Shtivelman et al.

[11] Patent Number: 6,072,864
[45] Date of Patent: Jun. 6, 2000

[54] TRANSFER-CONNECT TELEPHONY SERVICES UTILIZING AUTOMATED AUDIO SYSTEMS

[75] Inventors: Yuri Shtivelman, Belmont; Kenneth Scott Myers, Sausalito, both of Calif.

[73] Assignee: Genesys Telecommunication Laboratories, Inc., San Francisco, Calif.

[21] Appl. No.: 08/982,114

[22] Filed: Dec. 1, 1997

[51] Int. Cl.[7] .......................... H04M 3/54; H04M 3/523; H04M 7/00

[52] U.S. Cl. ......................... 379/210; 379/211; 379/212; 379/221; 379/265

[58] Field of Search ...................... 379/265, 266, 379/211, 212, 219, 220, 221, 210

[56] References Cited

U.S. PATENT DOCUMENTS 5,818,907  10/1998  Maloney et al. ........................... 379/34
5,848,131  12/1998  Shaffer et al. .......................... 379/88.2
5,901,214   5/1999  Shaffer et al. ........................... 379/220
5,940,497   8/1999  Miloslavsky ............................ 379/265

*Primary Examiner*—Harry S. Hong
*Attorney, Agent, or Firm*—Donald R. Boys; Central Coast Patent Agency

[57] ABSTRACT

A call re-directing system associated with a call center integrates an interface on a computer station at an agent station having a telephone, a CTI-application executing on a processor connected to a telephony switch, and an DSP-controller to operate with Transfer Connect protocols for re-directing misrouted telephone calls. In a preferred embodiment, data associated with a call is transferred to the new destination of a rerouted call and re-associated with the call.

12 Claims, 1 Drawing Sheet

TRANSFER-CONNECT TELEPHONY SERVICES UTILIZING AUTOMATED AUDIO SYSTEMS

FIELD OF THE INVENTION

The present invention is in the area of telephone call processing and switching, and pertains more particularly to intelligent call-routing systems including all multimedia communication aspects of intelligent networks, call-center technology including computer-telephony integration (CTI), and Internet protocol telephony networks and related technology.

BACKGROUND OF THE INVENTION

Telephone call processing and switching systems are, at the time of the present patent application, relatively sophisticated, computerized systems, and development and introduction of new systems continues, including Internet-integrated telephony systems, which are known in the art as Internet Protocol Telephony (IPT) systems. It is also true that the older telephony call-switching networks, and the more recent Internet telephony systems are beginning to merge, and many believe will one day be completely merged.

Much information on the nature of such hardware and software is available in a number of publications accessible to the present inventors and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference. There are similarly many documents and other sources of information describing and explaining IPT systems, and such information is generally available to those with skill in the art.

At the time of filing the present patent application there continues to be remarkable growth in telephone-based information systems, including IPT systems, wherein conventional telephone functions are provided by computer hardware and software. Recently emerging examples are telemarketing operations and technical support operations, among many others, which have grown apace with development and marketing of, for example, sophisticated computer equipment. More traditional are systems for serving customers of large insurance companies and the like. In some cases organizations develop and maintain their own telephony operations with purchased or leased equipment, and in many other cases, companies are outsourcing such operations to firms that specialize in such services.

A large technical support operation using one or more call centers is a good example of the kind of applications of telephone equipment and functions to which the present invention pertains and applies, and such systems may be used from time to time in the current specification for example purposes. Such a system frequently has a country-wide or even world-wide matrix of call centers for serving customer's needs.

Such call center operations are more and more a common practice to provide redundancy and decentralization.

In a call center, a relatively large number of agents typically handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), Private Branch Exchange (PBX), or PSTN. Each agent also typically has access to a computer platform having a video display unit (PC/VDU) which may be adapted, with suitable connectivity hardware, to process Internet Protocol Network Telephony (IPNT) calls.

At the time of the present patent application intelligent telephony networks and IP networks share infrastructure to some extent, and computer equipment added to telephony systems for computer-telephony integration (CTI) may also be capable of Internet connection and interaction. Therefore there is often no completely clear distinction as to what part of a network is conventional telephony, and what part of a network is IPNT.

In conventional telephony systems, such as public-switched telephony networks (PSTNs), there are computerized service control points (SCPs) that provide central routing intelligence (hence intelligent network). IPNs do not have a central router intelligence, such as a SCP. IPNs, however, have multiple Domain Name Servers (DNS), whose purpose is basically the same as the routers in intelligent networks, which is controlling the routing of traffic. Instead of telephony switches (PBXs), IP switches or IP routers are used.

An organization having one or more call centers for serving customers typically provides one or more telephone numbers to the public or to their customer base, or both, that may be used to reach the service. In the case of an IP network, a similar organization may provide an IP address for client access to services, and there are a number of ways the IP address may be provided. Such numbers or addresses may be published on product packaging, in advertisements, in user manuals, in computerized help files, and the like.

Routing of calls in intelligent networks, then, may be on several levels. Pre-routing may be done at SCPs and further routing may be accomplished at individual call centers. As described above a call center in an intelligent telephony system typically involves a central switch The central switch is typically connected to a publicly-switched telephone network (PSTN), well-known in the art. Agents, trained to handle customer service, man telephones connected by station-side ports to the central switch. This arrangement is known in the art as Customer Premises Equipment (CPE).

If the call center consists of just a central switch and connected telephone stations, the routing that can be done is very limited. Switches, although increasingly computerized, are limited in the range of computer processes that may be performed. For this reason additional computer capability in the art has been added for such central switches by connecting computer processors adapted to run control routines and to access databases. The processes of incorporating computer enhancement to telephone switches is known in the art as Computer Telephony Integration (CTI), and the hardware used is referred to as CTI equipment.

In a CTI system telephone stations connected to the central switch may be equipped also with computer terminals, as described above, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center. Agents having access to a PC/VDU connected on a LAN to a CTI processor in turn connected to a telephony switch, may also have multi-media capability, including Internet connectivity, if the CTI processor or another server connected to the LAN provides control for Internet connectivity for stations on the LAN.

When a telephone call arrives at a call center, whether or not the call has been preprocessed at a SCP, typically at least the telephone number of the calling line is made available to the receiving switch at the call center by a telephone carrier. This service is available by most PSTNs as caller-ID information in one of several formats. If the call center is computer-enhanced (CTI) the phone number of the calling party may be used to access additional information from a database at a server on the network that connects the agent workstations. In this manner information pertinent to a call may be provided to an agent.

Further to the above, IPNT systems at the time of the present patent application are much less sophisticated in provision of intelligent routing, parallel data transfer, supplemental data provision to agents, and the like than conventional telephony intelligent networks. The advantages that embodiments of the invention described below bring to conventional telephony systems may also in some cases be provided to ITP systems and systems in which the form of the network between conventional telephony and IPT is blurred.

One problem that frequently occurs in call center operations is the problem of mis-routed calls; that is, calls that arrive at and agent's station, and the agent, in interacting with the caller realizes that he or she is not the right person to help the caller. This can happen in several ways. There may be some hardware or software failure, for example, resulting in a call being routed to a different agent than intended. It may be possible as well, that a caller has provided incorrect information to an initial-processing system, for any of a number of reasons, and the call is misrouted as a result. An even more common reason for mis-routed calls is load balancing that may be done in the network without intelligence.

In the case of misrouted calls, it is necessary that an agent to which a call is initially routed has a process available for re-routing such calls to another agent more suited to help the caller. In conventional systems an agent receiving a mis-routed call is limited to manually placing a new call to another destination, and then connecting the existing call to the new call. In a system known to the inventors, which is described in detail below, in computer-enhanced (CTI) systems, an improved apparatus and system is taught for agent-initiated dynamic requeing. In this inventive system an agent may return a call to a re-routing point, either locally or in the network, along with data associated with the call, and the router at the re-routing point will then reroute the call to another agent, using additional or corrected data supplied by the original recipient of the call.

Recently some Network providers have provided a service called, in some areas, 800 Transfer Connect. This service allows a network subscriber to redirect calls from one location to another by entering in-band Dual-Tone Multiple-Frequency (DTMF) commands. Using such a system a subscriber may redirect a call through the network simply by pressing keys on the telephone keypad while the call is connected, much as one would dial an original call.

There are, unfortunately, a number of drawbacks to the Transfer Connect Service. For one thing, agents need to remember complicated sequences of DTMF commands and the handling of responses requires usually expensive additional equipment. The system returns error messages and negotiates by DTMF tones as well, and it is difficult for an agent to remember and to respond to DTMF tones. Further, in modern call centers, data is typically associated with a call, and, although data can in some instances be transferred using conventional services on ISDN trunks, there is no broad capability in the Transfer Connect system for data to be transferred with a call to another agent, especially if the call has to be redirected through the network.

What is clearly needed is a method and apparatus including software whereby an incoming call with it's associated data about the caller can be transferred or redirected in the network using the DTMF Transfer Connect capability, without termination of the call in the network, and the transfer can be accomplished at the discretion of the agent without the agent having to understand the various DTMF commands.

SUMMARY OF THE INVENTION

In a preferred embodiment of the present invention a call re-routing system is provided, comprising an agent station having a telephone connected to a telephony switch and a computer platform connected on a local area network (LAN) to a computer processor and the telephony switch, the processor running an instance of a Computer Telephony Integration (CTI) application; an audio facility for generating and decoding dual-tone, multi-frequency (DTMF) signals, and adapted to Transfer-Connect DTMF protocol; and a software routine executing on the agent station computer platform, and adapted to provide a user interface for an agent to select re-routing destinations for received calls, and to signal the audio facility to signal dialing of selected destinations by DTMF signals. In some embodiments the audio facility is in the telephony switch, and in others a separate audio facility is provided connected by data link to the switch.

In another aspect of the invention a system for forwarding telephone calls via Transfer-Connect DTMF protocol is provided, comprising a computerized interface adapted for enabling a user to select a forwarding destination for a telephone call; and a computerized audio generating and recognition facility responsive to the computerized interface and adapted for negotiating with a Transfer-Connect facility following instructions from the computerized interface. The computerized interface is preferably implemented on a computer platform at an agent station in a computerized telephony call center. The computerized audio facility may be a part of a telephony switch connected through a computer processor to the computer platform at the agent station, or a separate facility connected on a local area network to a telephony switch and to the computer platform.

In still another aspect a call-rerouting program for a computerized agent station in a telephony call center is provided, comprising a graphical user interface comprising selectable indicia for a user to select destinations for rerouting telephone calls; and a command facility for issuing commands to a computerized telephony switch system to generate a DTMF string according to a Transfer-Connect protocol to re-route a telephone call terminated at the computerized telephony switch.

In yet another aspect a method for re-routing a telephone call connected at an agent's telephone at an agent station in a call center having a computer-telephony integrated (CTI)-enhanced telephony switch connected by a telephony trunk to an intelligent telephony network is provided, comprising steps of (a) selecting, via a graphical interface at a computer platform accessible to the agent station and coupled to the telephony switch through a CTI processor running an instance of a CTI application (T-Server), a new destination for the telephone call; (b) commanding from the computer platform generation of a DTMF command for forwarding the telephone call to the new destination via a Transfer-Connect facility; (c) generating by a DTMF audio generation and reception facility the DTMF command to forward the telephone call; and (d) forwarding the call via the Transfer-Connect facility in the telephony network to the new destination by the generated DTMF command.

The method may further comprise a step for negotiating with the Transfer-Connect facility by DTMF tones, including receiving and responding to acknowledgment and error signals. This method in some instances may have further steps, such as (e) negotiating between the T-Server at the first call center and a second T-Server at the second call center via a communication link a destination at the second call center for the call; (f) providing the negotiated destination to the audio generation and reception facility for generating a DTMF command to forward the call to the negotiated destination; (g) transferring the data associated with the call to the second call center via the communication link between the T-Servers; and (h) re-associating the data with the transferred call at the destination point at the second call center. An additional step in some embodiments is for connecting the call at the second call center to a telephone at an agent station at the second call center, and displaying the data re-associated with the call at the second call center at a computer platform at the agent station at the second call center to which the call is connected.

In embodiments of the present invention an apparatus and method for transferring calls takes advantage of the existing Transfer-Connect facility and protocol without requiring that any agent know or remember the DTMF signals of the Transfer-Connect protocol.

BRIEF DESCRIPTION OF THE DRAWING FIGURES

FIG. 1 is a system diagram of a call re-routing system using Transfer Connect according to an embodiment of the present invention.

DESCRIPTION OF THE PREFERRED EMBODIMENTS

Figure 1:
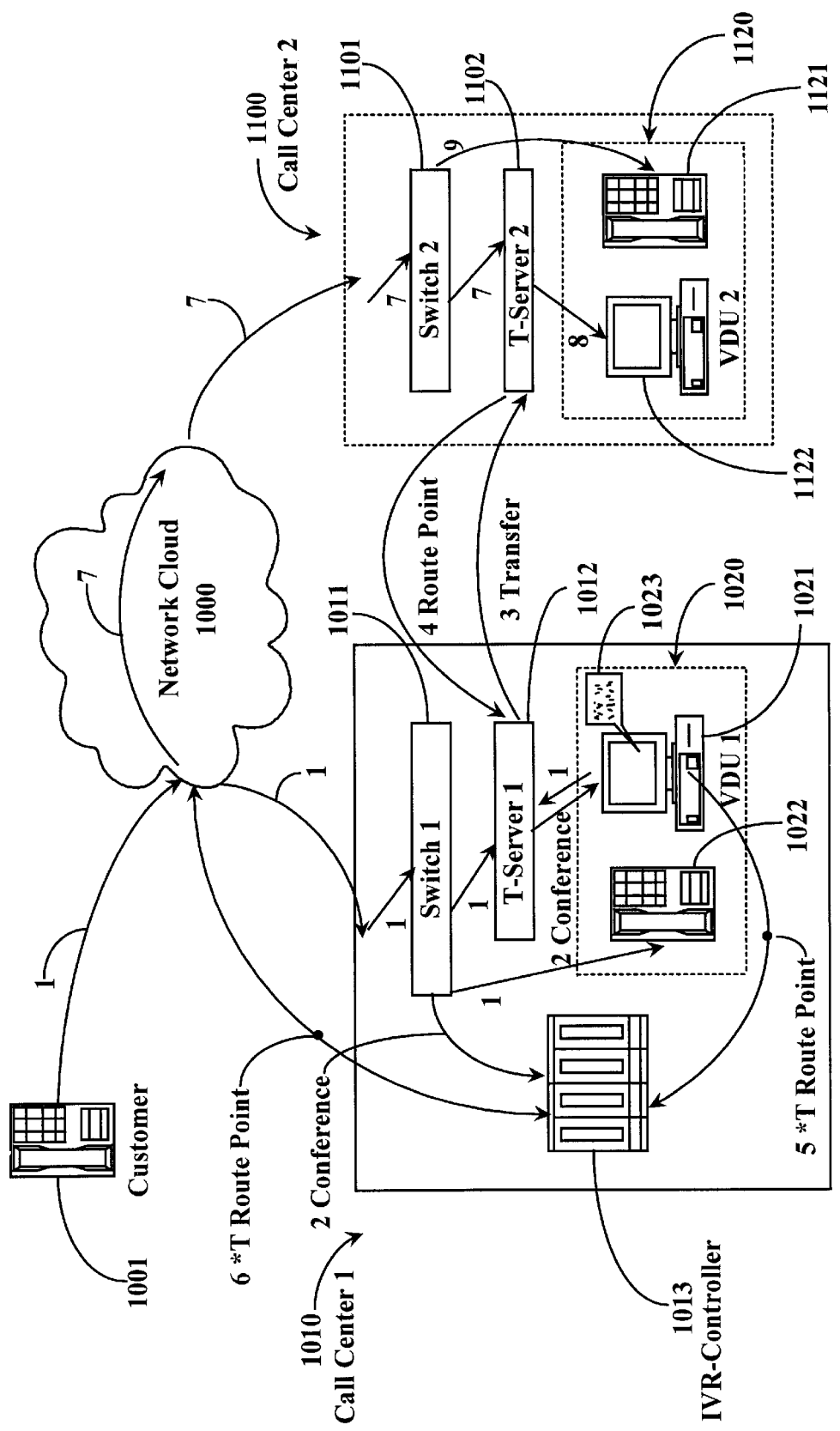

In an embodiment of the present invention a method and apparatus, including software, is provided for the purpose of transferring an incoming call back into a telephony network where it is re-directed with the aid of DTMF signaling. This innovative approach combines existing DTMF services such as 800 Transfer Connect offered, for example, by AT&T with a unique desktop application adapted to communicate with a Digital Signal Processor (DSP) server having an interactive voice response (IVR) capability for both detecting and sending DTMF commands to and from switches in the network. The software in this embodiment also communicates with various Computer-Telephony Integration (CTI) servers, called in this specification T-servers, that monitor and control central switches within distributed call centers.

FIG. 1 is a system diagram of a DTMF-enabled call-routing system according to an embodiment of the present invention. In FIG. 1 two call centers 1010 (Call Center 1) and 1100 (Call Center 2) are shown, and each has a telephony switch (1011 and 1101 respectively). In each call center the switch is enhanced by a CTI processor running a CTI application called a T-Server in this specification. Each call center also has at least one agent station (1020 and 1120), and each agent station has a telephone (1022 and 1121). Each agent station also has a computer station with a video display unit (PC/VDU) illustrated by elements 1021 and 1122.

In FIG. 1 not all of the physical connectivity is shown. Lines between elements show virtual connections rather than physical connections. The physical connectivity will be apparent to those with skill in the art given the detailed descriptions herein. Each switch at a call center for example is connected to the network by at least one high bandwidth telephony trunk, and to the agent stations at a call center by station-side ports. PC/VDUs at each call center are interconnected on a Local Area Network (LAN) which also connects to the processor running the T-Server and the processor connects to the telephony switch. These connections are well known in the art.

A customer at telephone 1001 in this example calls in to a Service Control Point (SCP) not shown, within a network represented by cloud 1000. Network cloud 1000 can be a publicly-switched network (PSTN), or any other intelligent telephony network. An intelligent network entry point is provided at the SCP and is typically accessed through an 800 number provided to customer 1001 through various means known in the art.

The incoming call in this example is routed to a telephony switch 1011 within a first call center 1010, and from the switch to telephone 1022, where an agent picks up the call. In this example, data is associated with the call. This may be data elicited from the caller at a Service Control Point (SCP) in the network and transferred to the call center via a data link not shown connecting to a T-Server, and separate from the phone line on which the call is forwarded, or it may be data retrieved in the call center from a database accessible to the agent's computer 1021 using call-associated data as a key, or both. The source of the data is not particularly relevant, but the fact of data associated with the call is significant to the invention. This data is typically sent to the agent to which the call is transferred, and is displayed on the VDU of the computer platform at the agent station. All of the virtual paths for this incoming call and data are labeled (1) in FIG. 1.

In this example, the call arriving at the agent at telephone 1022 is mis-routed. When the agent connects he/she becomes quickly aware that the call needs to go to a different agent. In a preferred embodiment a unique application 1023 is executing on the receiving agent's PC/VDU 1021. This application enables the agent to reroute the call using a connected DSP-controller 1013 and the Transfer Connect capability of the network, operating with DTMF tones. DSP-controller 1013 is capable of generating the needed DTMF tones and of receiving an interpreting DTMF tones according to the Transfer Connect protocol. In some embodiments the telephony switch (1011) at the call center will be capable of managing the DTMF signaling and negotiation in conjunction with on-board software. In many cases the switch cannot do so, and the DSP-controller is needed.

Application 1023 may be implemented in a number of ways, but has a specific unique functionality described herein. One of the functions is to provide an interface for the agent to select a forwarding destination for the call. This may be done, for example, by selecting from a range of icons on the VDU screen, the icons representing agent stations to where a call may be forwarded, or by selecting from a range of agent skills, which the application may associate with specific forwarding destinations. In this embodiment, the call is forwarded to an agent at call center 1100 through the network by use of the Transfer Connect service available in the network.

Application 1023, once the agent selects a destination, sends a command to T-server CTI application 1012 to conference with DSP-Controller 1013. The actual channel is opened via switch 1011 which is controlled by T-server 1012. The virtual connection for this conference is shown on FIG. 1 as (2 Conference). After opening a conference channel, the desktop application sends a command to T-server 1012 to transfer the call (with associated data) to a T-server 1102 located at call center 1100 and connected to switch 1101. T-Server 1012 is adapted to cooperate with application 1023 and controller 1013 to accomplish the purposes of the invention.

In the preferred embodiment T-Servers in the call centers and in the network are interconnected by digital links, such as a Wide Area Network (WAN). T-server 1012 then sends a request to T-server 1102 via digital connection for an external routing point. T-server 1102 returns an available routing point in switch 1101, which is shown as virtual connection (4 Route Point). T-server 1012 then returns the "long" number of the external routing point to application 1023 without activating switch 1011. The desktop application then sends the "long" number data to DSP-Controller 1013 via T-Server 1012. DSP-Controller 1013 converts the given "long" number into a speed dial number, in those networks requiring it, and sends the transfer command into network cloud 1000 via DTMF signaling (shown as 6*T route point. The call is then automatically transferred to the external routing point on switch 1101 (Path 7). Associated data is transferred directly from T-Server 1012 to T-Server 1102 by digital connection (3 Transfer), and T-server 1102 matches the previously transferred data to the arriving call, which is then transferred to the appropriate agent at agent station 1120, selected by the agent at station 1020.

An agent receiving a call can conference the call, transfer the all to yet another agent, send the call back to the first agent, place the call in queue, etc. As described above, data associated with the call is forwarded to the desired destination via parallel data transfer.

An advantage of the present invention over other ways of working with the Transfer Connect protocols is that agents need not be trained to recognize the DTMF signals in the Transfer Connect protocol. The switch at the call center or the DSP handles the DTMF commands and negotiation.

It will be apparent to one with skill in the art that there are many ways to implement embodiments of the present invention without departing from the spirit and scope of the present invention. For example, in some embodiments, features of the present invention may be employed in an IPNT system as well as a CTI system or in mixed network systems, such as a multimedia-enabled call center. The invention is limited only by the following claims.

What is claimed is:

1. A call re-routing system comprising:
    an agent station having a telephone connected to a telephony switch and a computer platform connected on a local area network (LAN) to a computer processor and the telephony switch, the processor running an instance of a Computer Telephony Integration (CTI) application;
    an audio facility for generating and decoding dual-tone, multi-frequency (DTMF) signals, and adapted to Transfer-Connect DTMF protocol; and
    a software routine executing on the agent station computer platform, providing a user interface for an agent to select rerouting destinations for received calls, and to signal the audio facility to signal dialing of selected destinations by DTMF signals.

2. The system of claim 1 wherein the audio facility is integrated with the telephony switch.

3. The system of claim 1 wherein the audio facility is separate from the telephony switch and connected on the LAN.

4. A system for forwarding telephone calls via Transfer-Connect DTMF protocol, comprising:
    a computerized interface for enabling a user to select a forwarding destination for a telephone call; and
    a computerized audio generating and recognition facility responsive to the computerized interface for negotiating with a Transfer-Connect facility following instructions from the computerized interface.

5. The system of claim 4 wherein the computerized interface is implemented on a computer platform at an agent station in a computerized telephony call center.

6. The system of claim 5 wherein the computerized audio facility is a part of a telephony switch connected through a computer processor to the computer platform at the agent station.

7. The system of claim 5 wherein the computerized audio facility is connected on a local area network to a telephony switch and to the computer platform.

8. A call-rerouting program for a computerized agent station in a telephony call center, comprising:
    a graphical user interface comprising selectable indicia for a user to select destinations for rerouting telephone calls; and
    a command facility for issuing commands to a computerized telephony switch system to generate a DTMF string according to a Transfer-Connect protocol to re-route a telephone call terminated at the computerized telephony switch.

9. A method for re-routing a telephone call connected at an agent's telephone at an agent station in a call center having a computer-telephony integrated (CTI)-enhanced telephony switch connected by a telephony trunk to an intelligent telephony network, comprising steps of:
    (a) selecting, via a graphical interface at a computer platform accessible to the agent station and coupled to the telephony switch through a CTI processor running an instance of a CTI application (T-Server), a new destination for the telephone call;
    (b) commanding from the computer platform generation of a DTMF command for forwarding the telephone call to the new destination via a Transfer-Connect facility;
    (c) generating by a DTMF audio generation and reception facility the DTMF command to forward the telephone call; and
    (d) forwarding the call via the Transfer-Connect facility in the telephony network to the new destination by the generated DTMF command.

10. The method of claim 9 further comprising a step for negotiating with the Transfer-Connect facility by DTMF tones, including receiving and responding to acknowledgment and error signals.

11. The method of claim 9 wherein data is associated with the call and the new destination for the call is a second call center, the method comprising steps for:
    (e) negotiating between the T-Server at the first call center and a second T-Server at the second call center via a communication link a destination at the second call center for the call;

(f) providing the negotiated destination to the audio generation and reception facility for generating a DTMF command to forward the call to the negotiated destination;

(g) transferring the data associated with the call to the second call center via the communication link between the T-Servers; and (h) re-associating the data with the transferred call at the destination point at the second call center.

12. The method of claim 11 further comprising a step for connecting the call at the second call center to a telephone at an agent station at the second call center, and displaying the data re-associated with the call at the second call center at a computer platform at the agent station at the second call center to which the call is connected.

* * * * *